March 25, 1958 — J. B. DYER — 2,827,793
WINDSHIELD WIPER ACTUATING MECHANISM
Filed July 2, 1953 — 2 Sheets-Sheet 1
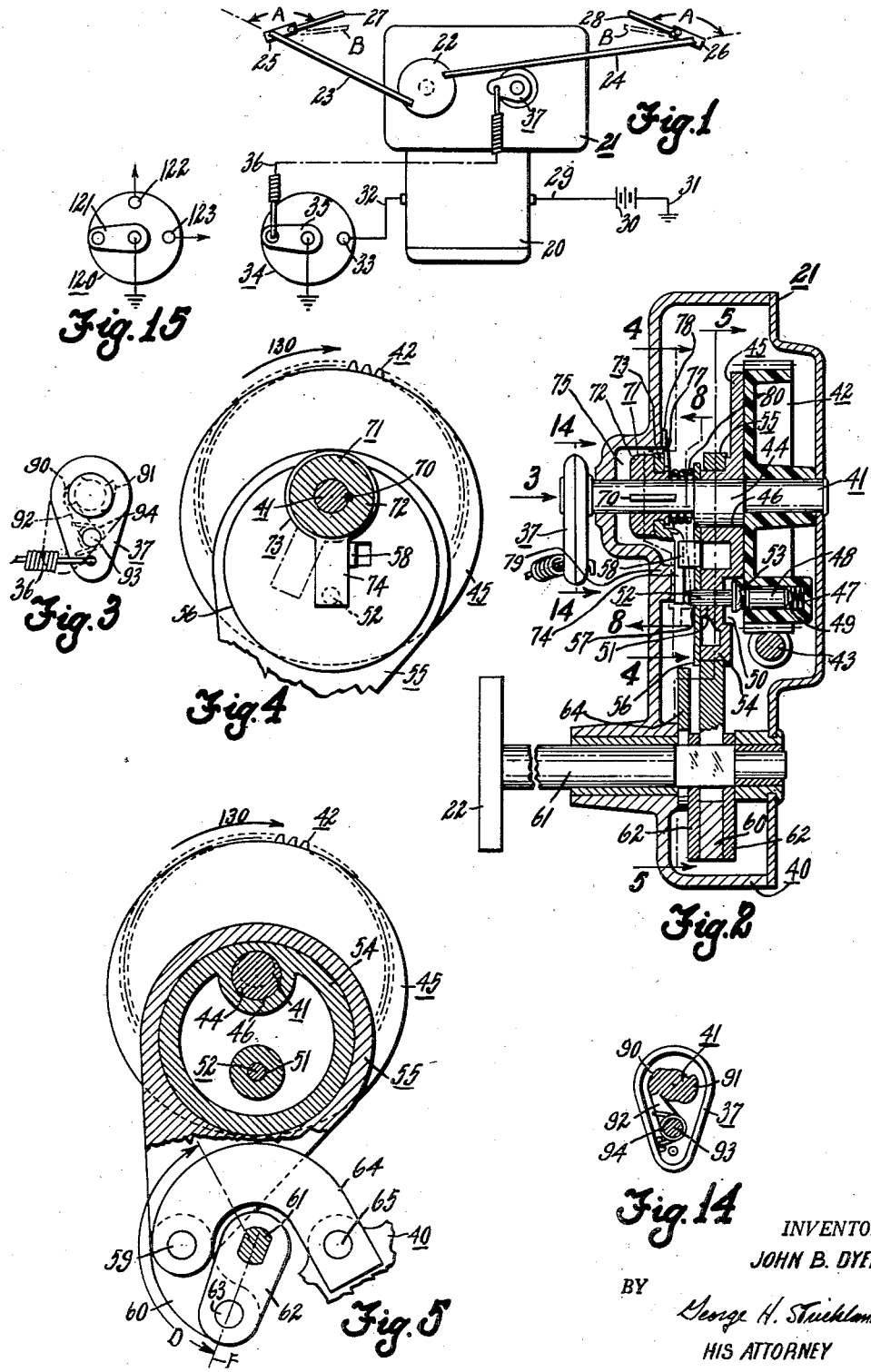
INVENTOR.
JOHN B. DYER
BY George H. Strickland
HIS ATTORNEY March 25, 1958 J. B. DYER 2,827,793
WINDSHIELD WIPER ACTUATING MECHANISM
Filed July 2, 1953 2 Sheets-Sheet 2
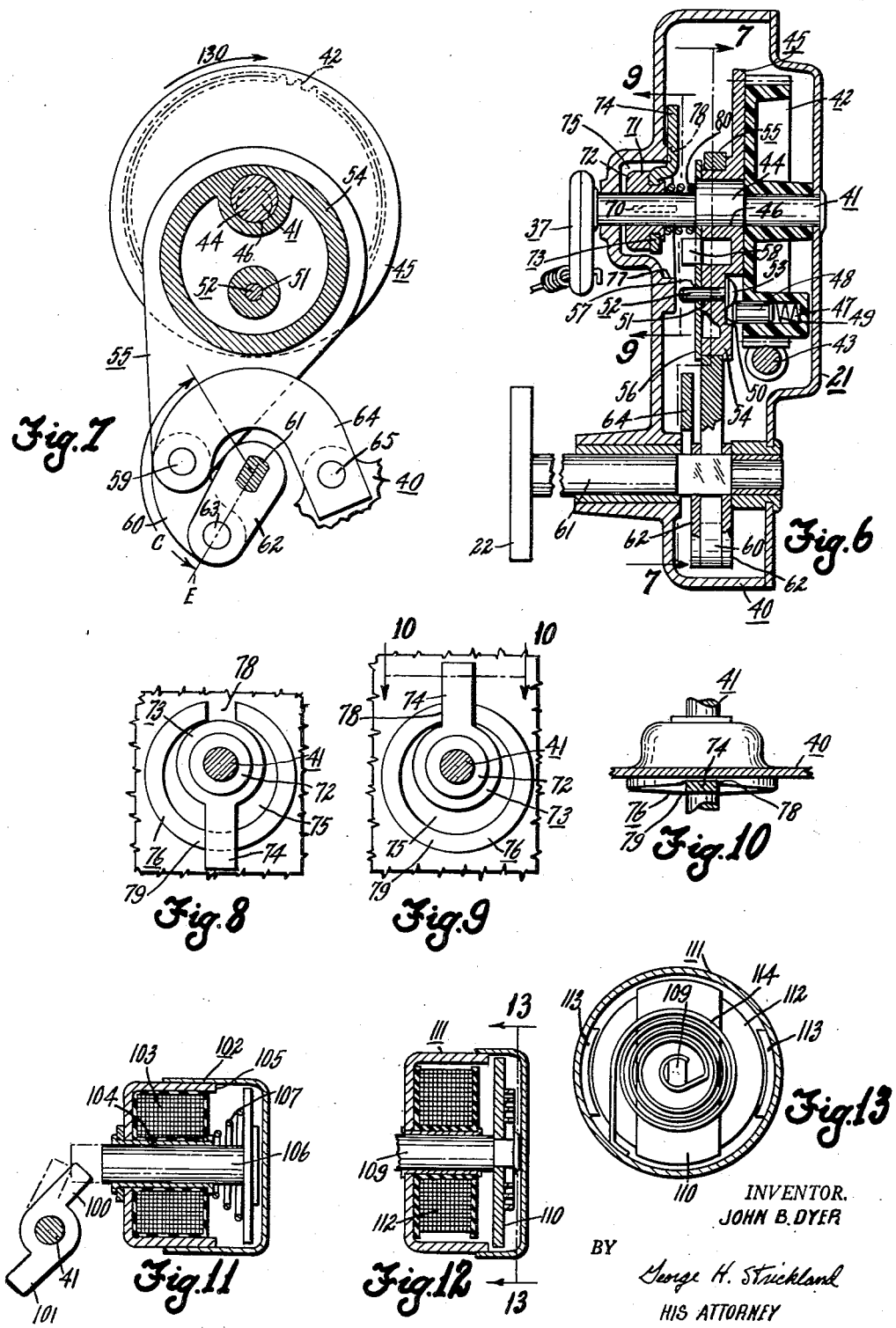
INVENTOR.
JOHN B. DYER
BY George H. Strickland
HIS ATTORNEY

United States Patent Office 2,827,793
Patented Mar. 25, 1958

2,827,793

WINDSHIELD WIPER ACTUATING MECHANISM

John B. Dyer, Syracuse, N. Y., assignor to General Motors Corporation, Detroit, Mich., a corporation of Delaware Application July 2, 1953, Serial No. 365,735

17 Claims. (Cl. 74—75)

The present invention pertains to windshield wiper actuating mechanisms, and more particularly to a power driven actuating mechanism for windshield wipers.

Heretofore, electric motor driven actuating mechanisms for windshield wipers have been developed which include means for moving wiper blades out of the normal range of vision to a parked position. Of this type some prior devices positively drive the wiper blades to the parked position, and others utilize coasting motor inertia to accomplish this result. This invention relates to the latter type of actuating mechanism and provides a compact, economical assembly for accomplishing the desired results. Accordingly, among my objects are the provision of a windshield wiper actuating mechanism including means for automatically increasing the amplitude of oscillation imparted to wiper blades when it is desired to park the same; the further provision of simplified control means for mechanism of the aforesaid character; and the still further provision of means for interrupting the driving connection between a motor and motion converting mechanism after the wiper blades have been moved to the parked position.

The aforementioned and other objects are accomplished in the present invention by providing means for varying the operating length, or throw, of a crank associated with the mechanism in accordance with the position of a control element. Specifically, the actuating mechanism includes means for converting rotary motion to oscillatory motion, which means comprise a compound linkage arrangement driven by a connecting rod that is pivotally connected to an eccentric member adapted to be driven by a unidirectional rotatable member. The eccentric member constitutes a crank, the rotational axis of which may be varied to thereby vary the effective operating length of the connecting rod and the amplitude of oscillation imparted to a driven member by the compound linkage arrangement.

The driving member is rotatably supported on a control shaft, the shaft having an integral eccentric portion about which the eccentric member, or crank, is supported. A clutch is employed to drivingly connect the eccentric member to the driving member for rotation therewith about the shaft. The engagement and disengagement of the clutch is controlled by an arm that is keyed to the shaft such that relative axial movement between the arm and shaft is permitted, while relative rotation therebetween is precluded. The control arm is spring biased against a cam surface formed on the inner wall of a housing in which the shaft is journaled. The cam surface is constituted by an annular shoulder, the edge of which is inclined throughout substantially 180° to a rise in both directions from a dwell, the dwell being disposed diametrically opposite the rise. In addition, the annular shoulder is notched at the dwell to disrupt the otherwise smooth contour of the cam surface for a reason which will appear more fully hereinafter.

The eccentric member carries a projection that is adapted to engage the clutch control arm and rotate the control arm and shaft from the came rise to the notched dwell, and vice versa. When the control arm is moved to a position in alignment with the notched dwell, the arm is moved axially under its spring bias to a position where the projection of the eccentric member does not engage the arm during its movement about the control shaft. When the clutch control arm is positioned on the cam rise, the clutch is released, or disengaged, thereby permitting rotation of the driving member relative to the eccentric member. The clutch control arm may be moved either manually, or automatically off the cam rise, and out of the cam dwell slot throughout a small angular distance, upon actuation of a control element, which is operable in conjunction with a switch for an electric motor that is operatively connected to the driving member of the actuating mechanism.

Operation of the mechanism is as follows, it being assumed that the clutch is initially disengaged, the wiper blades parked, and the electric motor deenergized. When the operator moves a control knob to a position calling for wiper operation, the motor control switch is moved to the closed position, thereby energizing the electric motor, and the control element and shaft is moved throughout a small angular distance either manually, in the preferred embodiment, or automatically, in modified embodiments, to thereby move the clutch control arm off the cam rise and permit the clutch to be engaged. Accordingly, rotation will be imparted to the eccentric member by the driving member, and the projection of the eccentric member will move the control arm and shaft throughout an angle of substantially 180°, whereupon the control arm will drop into the cam dwell slot under spring bias, so that continued rotation of the eccentric member will not effect movement of either the control arm or shaft. With the several component parts in this position, rotation of the driving member will impart oscillation to the driven member throughout an arc of constant amplitude. In a conventional manner the oscillating driven member may be connected by links, as shown, or by a flexible cable means, to a pair of spaced rock shafts to which wiper blades are attached. Thus, the wiper blades are moved throughout their wiping strokes over a surface of a windshield.

When the operator desires to stop wiper operation, the manual control element is moved to the off position, thereby deenergizing the motor and again moving the control shaft and clutch control arm throughout a small angular distance in the same direction they are moved when initiating operation. This small angular movement is sufficient to move the clutch control arm out of the cam dwell slot so that rotation of the eccentric member will cause the projection thereof to engage the control arm and move it to the cam rise where the clutch will be disengaged. The driving member continues to rotate after deenergization of the motor by reason of coasting motor inertia. Moreover, rotation of the clutch control arm throughout substantially 180° results in a like movement of the control shaft. In this manner the eccentric portion of the control shaft is positioned to vary the rotational axis of the eccentric member, or crank, thereby increasing the effective operating length of the connecting rod so that the amplitude of oscillation imparted to the driven member is increased. The amplitude of oscillation is increased sufficiently to move the wiper blades out of the normal range of vision to a parked position, preferably against the cowl of a vehicle, at which time, the driving connection between the driving member and the eccentric member is interrupted. Thus, the driving member may coast to a standstill due to motor inertia without moving the wiper blades out of the parked position.

Further objects and advantages of the present invention will be apparent from the following description, reference being had to the accompanying drawings wherein a preferred embodiment of the present invention is clearly shown.

In the drawings:

Fig. 1 is a partially diagrammatic view illustrating a typical arrangement of the present invention.

Fig. 2 is a view, partly in section and partly in elevation, of actuating mechanism, constructed according to this invention, in the parked position.

Fig. 3 is a view taken in the direction of arrow 3 of Fig. 2.

Figs. 4 and 5 are views taken along the lines 4—4 and 5—5 of Fig. 2, respectively.

Fig. 6 is a view similar to Fig. 2, with the actuating mechanism in the running position.

Figs. 7 and 9 are views taken along lines 7—7 and 9—9 of Fig. 6, respectively.

Fig. 8 is a view taken along line 8—8 of Fig. 2.

Fig. 10 is a view taken along line 10—10 of Fig. 9.

Fig. 11 is a view, partly in section and partly in elevation, of modified clutch control means.

Fig. 12 is a view similar to Fig. 11 of another modified clutch control means.

Fig. 13 is a view taken along line 13—13 of Fig. 12.

Fig. 14 is a view taken along line 14—14 of Fig. 2.

Fig. 15 is a diagrammatic switch control arrangement for use with the modified clutch control means of Figs. 11 through 13.

With particular reference to Fig. 1, a windshield wiper arrangement is shown including a unidirectional electric motor 20, which is operatively connected by means to be described to actuating mechanism 21. The actuating mechanism 21 includes motion converting mechanism to be described, which converts rotation of the motor to oscillation of a driven member 22, which, as shown, is connected by links 23 and 24 to a pair of spaced rock shafts 25 and 26. The rock shafts are, in turn, connected to a pair of wiper blades 27 and 28, which move throughout the angle A during their wiping stroke across the surface of a windshield, not shown, and to the position B against the cowl of a motor vehicle, not shown, when operation of the mechanism is stopped.

The motor 20 is shown having a terminal connected by a conductor 29 to one terminal of a battery 30, the other battery terminal being connected to ground by conductor 31. Another terminal of the motor 20 is connected by the conductor 32 to the switch contact 33, of a manually operated switch 34. The switch 34 includes a rotatable switch blade 35, which is connected to ground. The switch blade is connected by means of a Bowden wire 36 to a control element 37 of the actuating mechanism 21, the function of which will be described hereinafter. The switch blade 35 may be connected to a suitable control knob, not shown, on the dash of a motor vehicle, likewise not shown. The arrangement is such that upon angular movement of the switch blade 35 from the position shown in Fig. 1 to a position where it is in engagement with contact 33, thereby energizing the motor 20, the control element 37 will be moved throughout a small angular distance in a clockwise direction and then in a counterclockwise direction back to the position shown in Fig. 1.

With particular reference to Figs. 2 through 10, the detailed construction of the actuating mechanism 21 will be described. The actuating mechanism 21 is enclosed by a housing 40 and includes a control shaft 41 rotatably journaled adjacent opposite ends within the housing 40. A worm gear 42 is supported for rotation about the shaft 41. The electric motor 20 of Fig. 1 includes a worm shaft 43, which projects into the housing 40 and drivingly engages the worm gear 42. Accordingly, rotation of the electric motor 20 will impart rotation to the worm 43, and the worm gear 42 will consequently be rotated about its bearing support on shaft 41. The worm gear, or driving member, is restrained against axial movement relative to the shaft 41 by reason of the fact that opposite surfaces of the hub portion thereof engage the inner surface of housing 40 and the radially projecting part of an integral eccentric portion 44 of the shaft 41. The worm gear 42 is preferably composed of a suitable polyamide plastic material, such as nylon, which is known to have excellent bearing qualities. An eccentric member 45 having an eccentric opening 46 is rotatably journaled about the eccentric portion 44 of the shaft 41. One surface of the eccentric portion 45 is disposed in contiguous relation to a surface of the worm gear 42.

The worm gear 42 includes an axially extending recess 47 adjacent the toothed periphery thereof, in which a plunger 48 is slidably disposed, the plunger being urged outwardly of the recess 47 by means of a spring 49. The eccentric 45 is provided with a recess 50 somewhat larger than the plunger 48, which recess is substantially the same radial distance from the center of shaft 41, as is the recess 47 in the worm gear. Inasmuch as the eccentric member 45 may move radially of the worm gear 42, the recess 50 is made of greater radial extent so that it is always capable of receiving the end of plunger 48. The plunger 48 constitutes a clutch member for drivingly connecting the worm gear 42 and the eccentric member 45. The eccentric member 45 also includes an axial opening 51, which communicates with the recess 50. A pin 52 is disposed within the opening 51, the pin 52 having a head portion 53 disposed within the recess 50. The operation of the clutch will be described hereinafter but suffice it here to say that when the pin 52 is in the position shown in Fig. 2, the head 53 has moved the plunger 48 out of the recess 50 to thereby disengage the clutch, while, in Fig. 6, the head 53 is in engagement with the bottom wall of recess 50, thereby permitting the plunger 48 to project into the recess 50 and thereby drivingly connect the worm gear and the eccentric member.

The eccentric member 45 includes an annular portion, or crank pin, 54 about which one end of a connecting rod 55 is pivotally supported. The connecting rod 55 is restrained against axial movement relative to the eccentric member 45 by means of a cover 56, which is connected by any suitable means to the end surface of the annular portion 54. It is apparent that the cover 56 provides an annular groove within which the end of the connecting rod 55 is situated. The cover 56 includes an opening 57, which is aligned with the opening 51 in the eccentric member 45, and the end of pin 52 projects through this opening. In addition, the cover member 56 includes an axially projecting tang 58, the function of which will be described hereinafter.

The connecting rod 55 is pivotally connected at 59 to one end of an operating link 60 of mechanism for converting rotation of the worm gear 42 to oscillation of a driven shaft 61 journaled within the housing 40. The driven shaft 61 has attached thereto an oscillatable arm, or lever, 62, which is pivotally connected at 63 to the other end of the operating link 60. A guide link, or lever, 64 has one end pivotally connected at 65 to the housing 40, and the other end pivotally connected at 59 to the pivotal connection between the connecting rod and the end of operating link 60. As the connecting rod is pivotally connected to the eccentric member, or crank, 45, rotation of the eccentric member 45 by the worm gear will effect continuous operation of the connecting rod, which will, in turn, effect oscillatory movement of the operating link 60, which will be transmitted to the shaft 61 through the lever 62. Inasmuch as the link 64 is fixedly pivoted to one end of the housing 40, the amplitude of oscillation imparted to the shaft 61 by the compound linkage will be controlled by the position of the rotational axis of the crank, or eccentric member, 45. Thus, if the orbit of the crank pin 54 is constant, oscillation of a fixed amplitude will be imparted to the shaft 61, whereas if the orbit of the crank pin 54 is varied, the amplitude of oscillation imparted to the shaft 61 will, likewise, be varied. When the eccentric portion 44 is in the running position, shown in Fig. 6, the crank pin orbit is at a minimum and the shaft 61 is oscillated throughout the angle C, as indicated in Fig. 7. However, when the eccentric portion 44 is in the position of Fig. 2, the orbit of the crank pin 54 is increased and the amplitude of oscillation imparted to shaft 61 is, likewise, increased to the angle D, as illustrated in Fig. 5. As the line E of Fig. 7 indicates the normal end position of the wiper blades during their wiping strokes, while the line F in Fig. 5 indicates the parked position of the blades, it is apparent that by increasing the amplitude of oscillation transmitted to the shaft 61, the wiper blades can be moved out of their normal wiping stroke to a parked position, preferably against the cowl of a motor vehicle, not shown.

With particular reference to Figs. 2, 4 and 6, the control shaft has attached thereto by means of a key 70, a clutch control assembly 71. The clutch control assembly includes a member 72, which is directly keyed to the shaft by the key 70 so that relative axial movement between the member 72 and the shaft 41 is permitted, while relative rotary movement therebetween is prevented. The member 72 carries a clutch control arm 73, which has an offset portion 74, that permits movement of the assembly 71 into a recess 75 of the housing 40. The offset portion 74 of the clutch control arm 73 engages a cam surface 76 formed by an inwardly projecting annular shoulder 77, eccentrically arranged with respect to the recess 75. As is seen particularly in Fig. 10, the cam surface 76 includes a notched dwell 78 diametrically opposed from a rise 79, the surface of the shoulder being inclined throughout substantially 180° in both directions from the notched dwell 78 to the rise 79. The offset portion 74 of the clutch control arm 73 is always maintained in engagement with the cam surface 76 by means of a spring 80 encompassing the shaft 41 and disposed between the eccentric cover 56 and the member 72.

When the clutch control arm is in the position shown in Fig. 2, the offset projection 74 thereof actuates the pin 52 so as to move the plunger 48 out of the recess 50 thereby disengaging the clutch. When the offset portion 74 of the clutch control arm is disposed within the cam dwell slot 78, as shown in Figs. 6, 9 and 10, the clutch will be engaged and the offset portion 74 will be moved out of alignment with the projection 58 on the eccentric cover 56.

The shaft 41 projects through one end wall of the housing 40 and has attached thereto the control element 37. As is shown particularly in Figs. 3 and 14, the projecting end of the shaft is formed with a pair of opposed ratchet teeth 90 and 91. The control element 37 has disposed therein a pawl 92 pivotally mounted by a trunnion 93 and urged by a spring 94 into engagement with the shaft 41. The element 37, as shown in Fig. 3, is connected to one end of the Bowden wire 36. The ratchet and pawl arrangement constitutes a one-way driving connection between the element 37 and the shaft 41. During movement of the switch blade 35 in Fig. 1 from the position shown to the position wherein it engages contact 33, the element 37 will be moved from the solid line position of Fig. 3 to the dotted line position and back to the solid line position. This small clockwise angular movement of the element 37 will, through the engaged pawl 92 and ratchet tooth 90, effect a small clockwise angular movement of the shaft 41. However, inasmuch as the pawl and ratchet arrangement constitutes a one-way driving connection, counterclockwise movement of the element 37 from the dotted line position of Fig. 3 to the solid line position thereof will not move the shaft 41. Inasmuch as the clutch control assembly 71 is rotatably connected to the shaft 41, the small angular movement of the shaft 41 will move the clutch control arm 73. The amount of movement need only be sufficient to either move the offset portion 74 out of the cam dwell slot 78, or off the high point of the cam rise 79, after which the eccentric cover projection 58 will move the clutch control arm throughout substantially 180° in a manner to be described more fully hereinafter.

A modification of the control mechanism is disclosed in Fig. 11, the direction of movement of shaft 41 being reversed. As shown in Fig. 11, the shaft 41 is provided with a pair of substantially diametrically opposed radially extending ears 100 and 101 through which a slight angular movement may be imparted to the shaft by means of a solenoid 102. The solenoid 102 includes a winding 103 having a central opening 104. The winding is associated with a pole assembly 105 such that the flow of current through the winding 103 will magnetize the pole assembly. An armature 106 is normally biased by means of a spring 107 against an end wall of the solenoid housing, and upon energization of the winding 103, the armature will move to the dotted line position of Fig. 11, thereby moving the shaft 41 throughout a small angular distance, by reason of the armature 106 engaging one of the projecting ears 100 or 101.

A further modified control mechanism is shown in Figs. 12 and 13. As is shown in Figs. 12 and 13, a shaft 109 has attached thereto adjacent its end an armature 110 of a rotary electromagnet assembly 111. The rotary electromagnet includes a winding 112 associated with a pole assembly 113. The armature 110 is normally biased by a torsion spring 114 to the position shown in Fig. 13. Upon energization of the electromagnet, the armature 110 will be attracted by the pole assembly 113, thereby imparting a small angular movement to the shaft 109. In this instance the shaft 109 would be operatively associated with the control element 37 for imparting thereto a small angular movement, which will be imparted to the shaft 41 through the one-way ratchet drive connection between the element 37 and the shaft 41.

With reference to Fig. 15, a modified switch assembly 120 is disclosed for controlling the operation of the wiper actuating mechanism when either of the electromagnetic assemblies of Figs. 11 through 13 is employed. In this instance the switch blade 121 is adapted to engage spaced contacts 122 and 123. One terminal of the windings of the electromagnets of Figs. 11 through 13 will be connected to the battery 30 and the other terminal to contact 122. Contact 123 will be connected, as in Fig. 1, to the electric motor. Accordingly, upon movement of the switch blade 121, the windings of the electromagnets will be initially energized and then deenergized to effect a small angular movement of the shaft 41 in the same direction when wiper operation is initiated, or interrupted.

*Operation*

The operation of the preferred embodiment, namely Figs. 1 through 10 and 14, will first be described. At the offset, it will be assumed that the wiper blades are in the parked position B of Fig. 1, the clutch is disengaged with the plunger 48 in the position shown in Fig. 2, and the electric motor 20 is deenergized. When operation of the actuating mechanism is desired, the operator actuates a control knob inside the vehicle, not shown, which rotates the switch blade 35 throughout substantially 180° into engagement with the contact 33. During movement of the switch blade 35 from the "off" position, shown in Fig. 1, to the "on" position where it engages contact 33, and before the motor 20 is energized, the control shaft 41 is moved throughout a small angular distance by means of the Bowden wire 36 and the control element assembly 37 including the one-way ratchet drive, hereinbefore described, so that the offset projection 74 of the clutch control arm is moved to the dotted line position shown in 4. In moving the clutch control arm offset portion 74 from the solid to the dotted line position, as shown in Fig. 4, the offset portion 74 is moved out of alignment with the end of pin 52, thereby permitting the pin to be moved to the left, as viewed in Fig. 2, by the spring biased plunger 48, when the pin and plunger are moved into alignment. Due to the one-way driving connection between the element 37 and the shaft 41, the shaft 41 and the clutch control arm 73 will retain its dotted line position when the switch blade is moved past the vertical position, as shown in Fig. 1, to the horizontal position wherein it engages contact 33. Thus, the motor is energized and rotation will be imparted to the worm gear 42 by the worm 43. When the plunger 48 moves into alignment with the recess 50 and the pin 52, the spring 49 will urge the plunger 48 into the recess 50 to drivingly connect the worm gear 42 with the eccentric member, or crank, 45. With the arrangement shown, the worm gear 42 will be rotated in the direction of arrow 130 in Figs. 4, 5 and 7. Thus, as soon as the clutch is engaged, the eccentric member 45 will, likewise, be rotated in a clockwise direction and the eccentric cover projection 58 will engage the offset portion 74 of the clutch control arm and move the clutch control arm throughout substantially 180° to the cam dwell slot 78, at which point the spring 80 will move the offset projection into the cam dwell slot, thereby moving the clutch control arm out of engagement with the rotating eccentric projection 58.

The actuating mechanism is now in its running position, as depicted in Figs. 6, 7, 9 and 10, and rotation of the eccentric member, or crank, 45 by the worm gear 42 will impart continuous motion to the connecting rod 55, and inasmuch as rotation of the clutch control arm 73 has positioned the shaft eccentric 44 in the position of Figs. 6 and 7, the orbit of the crank pin is at a minimum. Accordingly, the compound linkage arrangement will impart oscillation of constant amplitude to the shaft 61 and the driven member 22, from which it will be transmitted to the spaced rock shafts 25 and 26 by the links 23 and 24. In this manner the wiper blades 27 and 28 will be moved throughout their wiping strokes across the surface of a windshield, not shown.

When the vehicle operator desires to stop wiper operation, the control knob, not shown, is moved to the off position, which moves the switch blade 35 of Fig. 1 from a position where it engages contact 33 to the position shown in Fig. 1. In moving the switch blade back to the position of Fig. 1, the control element 37 is again actuated throughout a small angular distance, as shown in Fig. 3, such that the control shaft 41 is moved throughout a small angular distance in the clockwise direction. The small angular movement of the control shaft 41 is sufficient to position the offset portion 74 of the clutch control arm out of the cam dwell notch and on the smooth contour of the cam surface, in alignment with the end of the eccentric projection 58. It is to be understood that the motor 20 is constructed to have sufficient inertia to effect coasting movement of the driving member, or worm gear, 42 throughout at least one revolution after deenergization of the motor. Accordingly, clockwise movement of the worm gear 42 under coasting motor inertia will effect clockwise movement of the eccentric member 45 so that the projection 58 thereof will engage the offset portion 74 and move the clutch control arm to the position shown in Figs. 2, 4 and 8. When the offset portion 74 reaches the high point of cam rise 79, it will thrust the pin 52 to the right, from the position viewed in Fig. 6, to the position of Fig. 2, thereby moving the plunger 48 out of the recess 50 and disengaging the clutch. As the driving connection between the eccentric member 45 and the worm gear 42 is thus interrupted, the motor and worm gear 42 may coast to standstill. Inasmuch as the clutch control arm 73 is rotatably connected to the shaft 41, angular movement throughout substantially 180°, will effect a like movement of the shaft 41 so as to move the integral eccentric portion 44 from the position of Fig. 7 to the position of Fig. 5. In moving the eccentric from the position of Fig. 7 to the position of Fig. 5, the radius of the eccentric member, or crank, 45 is increased, thereby increasing the effective operating length of the connecting rod 55 to thereby increase the amplitude of oscillation imparted by the compound linkage to the shaft 61 and the driven member 22. Accordingly, the wiper blades are moved to the parked position B, as shown in Fig. 1, and simultaneously therewith the clutch constituted by the plunger 48 is disengaged, so that continued coasting of the worm gear 42 will not alter the position of the wiper blades 27 and 28. The mechanism is now conditioned for the next successive period of operation inasmuch as actuation of switch blade 35 will again displace the clutch control arm 73 so as to permit reengagement of the clutch arm motor energization.

With regard to the modified embodiments disclosed in Figs. 11 through 13 and 15, the operation is as follows. When wiper operation is initiated, the switch blade 121 initially engages contact 122, thereby energizing either the solenoid winding 103 in Fig. 11, or the winding 112 of the rotary electromagnet in Figs. 12 and 13. Accordingly, the shaft 41 will have imparted thereto a small angular movement sufficient to move the clutch control arm offset portion 74 off the cam rise. Continued movement of the switch blade will result in deenergization of the solenoid winding 103 in Fig. 11 and the winding 112 of the electromagnet in Figs. 12 and 13, but no movement will be transmitted to the control shaft 41. Thus, when the switch blade 121 engages contact 123, the motor is energized and the sequence of events are the same as described in connection with the preferred embodiment. Upon cessation of wiper operation, the control shaft 41 again has imparted thereto a slight angular movement by the solenoid in Fig. 11, or the rotary electromagnet in Figs. 12 and 13 sufficient to move the offset control arm projection 74 out of the cam dwell slot, whereupon the sequence of events is the same as aforedescribed in connection with the preferred embodiment.

From the aforegoing, it is apparent that the present invention provides an electric motor controlled wiper actuator mechanism wherein only one switch is employed to control the electric motor. Thus, the necessity in almost all prior actuating mechanisms for a parking switch, is obviated. Moreover, the present invention provides an actuating mechanism wherein the driving connection between the driving and driven members is interrupted after the blades reach the parked position, thereby preventing the wiper blades from being displaced from the parked position due to continued motor coasting after deenergization.

While the embodiment of the present invention as herein disclosed, constitutes a preferred form, it is to be understood that other forms might be adopted.

What is claimed is as follows:

1. Windshield wiper actuating mechanism including in combination, a rotatable driving member, a driven member, means including a crank carrying a crank pin interconnecting the driving and driven members whereby rotation of the driving member will impart oscillation to the driven member, means for varying the orbit of said crank pin, and cam actuated means operatively associated with the crank and the driving member for automatically interrupting the driving connection therebetween when the crank pin orbit is a maximum.

2. Windshield wiper actuating mechanism including in combination, a rotatable driving member, a driven member, means including a crank carrying a crank pin interconnecting the driving and driven members whereby rotation of the driving member will impart oscillation to the driven member, means including an eccentric operatively associated with said crank for varying the orbit of the crank pin to thereby vary the amplitude of oscillation imparted to said driven member, and cam actuated means operatively associated with the crank and said driving member for automatically interrupting the driving connection between said crank and said driving member when the crank pin orbit is a maximum.

3. A windshield wiper actuating mechanism including in combination, a rotatable driving member, a driven member, means including a crank arm carrying a crank pin interconnecting the driving and driven members whereby rotation of the driving member will impart oscillation to the driven member, clutch means operatively associated with said crank and said driving member for establishing a driving connection therebetween, means operable to vary the orbit of said crank pin whereby the amplitude of oscillation imparted to said driven member may be varied, and cam actuated means operable to automatically disengage said clutch means when the crank pin orbit is a maximum.

4. Windshield wiper actuating mechanism including in combination, a rotatable driving member, a shaft supporting said driving member and about which the driving member rotates, a driven member, means including a crank interconnecting the driving and driven members whereby rotation of the driving member will impart oscillation to said driven member, said shaft having an eccentric portion about which said crank is rotatably supported, and means including said eccentric portion for shifting the rotational axis of said crank to thereby vary the amplitude of oscillation imparted to said driven member.

5. Windshield wiper actuating mechanism including in combination, a rotatable driving member, a shaft supporting said driving member and about which the driving member rotates, a driven member, means including a crank carrying a crank pin interconnecting the driving and driven members whereby rotation of the driving member will impart oscillation to said driven member, said shaft having an eccentric portion about which said crank is rotatably supported, means including said eccentric portion for varying the orbit of said crank pin to thereby vary the amplitude of oscillation imparted to said driven member, and cam actuated means operatively associated with the crank and the driving member for automatically interrupting the driving connection therebetween when the crank pin orbit is a maximum.

6. Windshield wiper actuating mechanism including in combination, a rotatable driving member, a supporting shaft for said driving member about which the driving member rotates, a crank rotatably supported on said shaft, clutch means associated with the crank and said driving member for establishing a driving connection therebetween, a driven member, means including said crank carrying a crank pin interconnecting said driving and driven members whereby rotation of said driving member will impart oscillation to said driven member, means operable to vary the orbit of said crank pin whereby the amplitude of oscillation imparted to said driven member may be varied, and cam actuated means operable to automatically interrupt the driving connection between the crank and said driving member by releasing said clutch means when the crank pin orbit is a maximum.

7. Windshield wiper actuating mechanism including in combination, a rotatable driving member, a supporting shaft for said driving member about which the driving member is rotatable, said shaft having an eccentric portion, a crank rotatably supported about the eccentric portion of said shaft, a driven member, means including said crank interconnecting the driving and driven members whereby rotation of the driving member will impart oscillation to the driven member, and means operable to adjust the angular position of said shaft and the eccentric portion thereof to thereby shift the rotational axis of said crank whereby the amplitude of oscillation imparted to said driven member may be varied.

8. Windshield wiper actuating mechanism including in combination, a rotatable driving member, a supporting shaft for said driving member about which the driving member is rotatable, said shaft having an eccentric portion, a crank rotatably supported about the eccentric portion of said shaft, a driven member, means including said crank interconnecting the driving and driven members whereby rotation of the driving member will impart oscillation to the driven member, a housing in which said shaft is rotatably supported, an element rotatably attached to said shaft but movable axially relative thereto, means operable to move said element axially relative to said shaft toward said crank, and means operatively associated with the crank and driven thereby for engaging said element when it is moved axially toward said crank to thereby effect a predetermined angular movement of the element, shaft and eccentric portion of the shaft to shift the rotational axis of said crank.

9. Windshield wiper actuating mechanism including in combination, a rotatable driving member, a supporting shaft for said driving member about which the driving member is rotatable, said shaft having an eccentric portion, a crank rotatably supported about the eccentric portion of said shaft, said crank carrying a crank pin, a driven member, means including said crank pin interconnecting the driving and driven members whereby rotation of the driving member will impart oscillation to the driven member, a housing in which said shaft is rotatably supported, clutch means operatively associated with said crank and said driving member for establishing a driving connection therebetween, an element rotatably attached to said shaft but movable axially relative thereto, said element being operatively associated with said clutch means, and means operable to effect concurrent axial and rotational movement of said element to thereby rotate the shaft and the eccentric portion thereof to vary the orbit of said crank pin and disengage said clutch means when the crank pin orbit is a maximum.

10. Windshield wiper actuating mechanism including in combination, a rotatable driving member, a supporting shaft for said driving member about which the driving member is rotatable, said shaft having an eccentric portion, a crank rotatably supported about the eccentric portion of said shaft, said crank carrying a crank pin, a driven member, means including said crank pin interconnecting the driving and driven members whereby rotation of the driving member will impart oscillation to the driven member, a housing in which said shaft is rotatably supported, an element rotatably attached to said shaft but movable axially relative thereto, a cam surface within the housing and circumscribing said shaft, resilient means urging a portion of said element axially into engagement with said cam surface, clutch means operatively associated with the crank and the driving member for establishing a driving connection therebetween, and means operable to effect rotation of said element thereby effecting rotation of said shaft and the eccentric portion thereof to vary the orbit of said crank pin, rotation of said element relative to said cam surface effecting axial movement of said element relative to said shaft, the construction and arrangement being such that said element will disengage said clutch means when the crank pin orbit is a maximum.

11. Windshield wiper actuating and control mechanism including in combination, a housing, a control shaft rotatably supported within said housing, a rotatable driving member supported for rotation about said shaft, said shaft having an eccentric portion, a crank rotatably supported about said eccentric portion, said crank carrying a crank pin, clutch means operatively associated with the crank and the driving member for establishing a driving connection therebetween, a driven member, means including said crank pin interconnecting the driving and driven members whereby rotation of the driving member will impart oscillation to the driven member, a clutch control arm rotatably attached to said shaft but movable axially relative thereto, manually controlled means operatively associated with the control shaft for effecting a slight angular movement thereof, means coacting with said clutch control arm whereby a slight angular movement of said control shaft will effect axial movement of said control arm to a predetermined position, and means carried by said crank and engageable with said control arm in said predetermined axial position for effecting substantial angular movement of the control arm and the shaft, whereby the eccentric portion of said shaft will be positioned to increase the orbit of the crank pin to a maximum and the clutch control arm will be moved axially to disengage said clutch means when the crank pin orbit is a maximum.

12. The combination set forth in claim 11 wherein the manually controlled means for effecting a slight angular movement of the control shaft include a ratchet tooth on said shaft, and a manually operable pawl operatively associated with said ratchet tooth for effecting slight angular movement thereof.

13. The combination set forth in claim 12 wherein said driving member is operatively connected to and rotated by an electric motor, a switch for controlling the energization of said motor, and means operatively associated with the pawl and said switch for effecting slight angular movement of said shaft through the ratchet tooth when the switch is actuated to energize, or deenergize, said motor.

14. The combination set forth in claim 11 wherein the manually actuated means for effecting a slight angular movement of said control shaft includes a rotary electromagnet.

15. The combination set forth in claim 14 wherein the driving member is operatively connected to and rotated by an electric motor, and switch means for controlling the energization of said motor and said electro-magnet, the construction and arrangement being such that the electromagnet is successively energized and deenergized when the electric motor is either energized or deenergized.

16. The combination set forth in claim 11 wherein the manually actuated means for effecting a slight angular movement of said control shaft includes a radially extending arm on said control shaft and a solenoid operated plunger operatively associated with said arm for effecting said slight angular movement of said shaft.

17. The combination set forth in claim 16 wherein the driving member is operatively connected to and rotated by an electric motor, an electric circuit for said motor including switch means controlling the energization of said motor and switch means for controlling the energization of said solenoid, and means whereby the solenoid switch means are closed and opened prior to energization of said electric motor, and closed and opened after deenergization of said motor.

References Cited in the file of this patent

UNITED STATES PATENTS

| 2,452,492 | Schneider | Oct. 26, 1948 |
| 2,592,237 | Bradley | Apr. 8, 1952 |

FOREIGN PATENTS

| 113,122 | Great Britain | Jan. 24, 1918 |
| 956,140 | France | July 18, 1949 |